US012160086B2

(12) United States Patent
Mishima et al.

(10) Patent No.: US 12,160,086 B2
(45) Date of Patent: Dec. 3, 2024

(54) SPARK PLUG

(71) Applicant: Niterra Co., Ltd., Nagoya (JP)

(72) Inventors: Daisuke Mishima, Nagoya (JP); Tomohiro Iwatsuka, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/273,092

(22) PCT Filed: Jun. 8, 2022

(86) PCT No.: PCT/JP2022/023077

§ 371 (c)(1),
(2) Date: Jul. 19, 2023

(87) PCT Pub. No.: WO2022/264891

PCT Pub. Date: Dec. 22, 2022

(65) Prior Publication Data

US 2024/0305069 A1 Sep. 12, 2024

(30) Foreign Application Priority Data

Jun. 15, 2021 (JP) ................................ 2021-099370

(51) Int. Cl.
*H01T 13/08* (2006.01)
*H01T 13/32* (2006.01)

(52) U.S. Cl.
CPC ............ *H01T 13/08* (2013.01); *H01T 13/32* (2013.01)

(58) Field of Classification Search
CPC ................................ H01T 13/32; H01T 13/08
See application file for complete search history.

(56) References Cited

U.S. PATENT DOCUMENTS

| | | | | |
|---|---|---|---|---|
| 11,637,412 B2 * | 4/2023 | Mishima | ................ | H01T 13/20 313/118 |
| 2013/0015755 A1 * | 1/2013 | Inohara | .................. | H01T 13/32 313/141 |
| 2022/0360051 A1 * | 11/2022 | Ban | ........................ | H01T 13/08 |

FOREIGN PATENT DOCUMENTS

| | | | |
|---|---|---|---|
| JP | 2019-046660 | A | 3/2019 |
| JP | 2022-049385 | A | 3/2022 |

OTHER PUBLICATIONS

International Search Report from corresponding International Patent Application No. PCT/JP2022/023077, dated Aug. 23, 2022.

* cited by examiner

*Primary Examiner* — Kevin A Lathers
(74) *Attorney, Agent, or Firm* — KUSNER & JAFFE

(57) ABSTRACT

A spark plug includes a metallic shell member having a tubular portion extending along an axial line of the metallic shell, a center electrode disposed inside the tubular portion and extending along the axial line, and a ground electrode which is inserted into an opening 5 provided in the tubular portion and forms a gap between the center electrode and a forward end portion of the round electrode in a direction in which the round electrode extends. A screw thread is provided on an outer circumferential surface of the tubular portion. The opening has a sloping portion which tapers from the outer circumferential surface of the tubular portion toward an inner circumferential surface side. An angle formed between the 10 sloping portion of the opening and a tangent line to the outer circumferential surface is 90 degrees or greater.

4 Claims, 8 Drawing Sheets

SPARK PLUG

FIELD OF THE INVENTION

The present disclosure relates to a spark plug used for an internal combustion engine.

BACKGROUND OF THE INVENTION

Spark plugs have been used as igniting means for internal combustion engines such as engines for automobiles. In such a spark plug, a center electrode and a ground electrode are provided as constitutional elements for generating spark discharge. The center electrode is attached to a forward end side of an internal portion of a tubular metallic shell extending along an axial line, and extends along the axial line. The ground electrode is disposed to be close to a forward end portion of the center electrode.

Japanese Patent No. 2019-46660A ("JP2019-46660A") discloses an example that in some spark plugs, an opening is formed in the tubular metallic shell, and a rod-shaped ground electrode is inserted into the opening, thereby being attached to the metallic shell.

For example, in an ignition plug shown in FIG. 5 of JP2019-46660A, a hole 34c is formed in a forward end portion of an attachment screw portion 52c of a metallic shell 50c such that the hole 34c penetrates the attachment screw portion 52c in a direction orthogonal to an axial line AX of the ignition plug. Aground electrode tip 39c is press-fitted into the hole 34c.

Such a hole (opening) provided in the attachment screw portion of the metallic shell is formed by performing machining on an outer circumferential surface of the metallic shell. In general, the shape of the machined surface of the opening provided in the metallic shell is such that the machined surface is orthogonal to the center axis of the metallic shell as in the case of, for example, the ignition plug of JP2019-46660A.

However, if the machined surface of the opening is orthogonal to the inner diameter center axis of the metallic shell, when the spark plug is screwed into a threaded hole of an internal combustion engine, a screw thread portion which borders on the opening has a shape which inclines forward with respect to the rotating direction of the screw. Therefore, for example, when the spark plug is attached to the internal combustion engine, the screw thread of the spark plug may bite into the threaded hole of the internal combustion engine.

SUMMARY OF THE INVENTION

In view of the above, an object in one aspect of the present disclosure is to provide a spark plug which can restrain biting of the screw thread at the time of, for example, attaching the spark plug to an internal combustion engine.

A spark plug according to one aspect of the present disclosure comprises a metallic shell member having a tubular portion extending along an axial line, a center electrode disposed inside the tubular portion and extending along the axial line, and a ground electrode which is inserted into an opening provided in the tubular portion and forms a gap between the center electrode and a forward end portion of the ground electrode in a direction in which the ground electrode extends. In this spark plug, a screw thread is provided on an outer circumferential surface of the tubular portion, the opening has a sloping portion which tapers from the outer circumferential surface of the tubular portion toward an inner circumferential surface side as viewed in a cross section of the tubular portion which is taken orthogonal to the axial line at a position where a crest of the screw thread intersects with an edge of the opening, and an angle formed between the sloping portion of the opening and a tangent line to the outer circumferential surface at a boundary between the opening and the crest of the screw thread is 90 degrees or greater.

By virtue of the above-described configuration, for example, when the spark plug is screwed into a threaded hole of an internal combustion engine, the screw thread provided on the outer circumferential surface of the tubular portion does not incline forward with respect to the advance direction of the screw. Therefore, it is possible to decrease the possibility that the screw thread bites into the threaded hole of the internal combustion engine when the spark plug is attached to the internal combustion engine or when the spark plug is removed from the internal combustion engine.

In the above-described spark plug according to the one aspect of the present disclosure, the sloping portion may be provided at least over a region extending from the crest of the screw thread to a groove of the screw thread.

By virtue of the above-described configuration, the machined surface of the opening slopes over the entirety of the screw thread (namely, from the crest of the screw thread to the bottom surface of the screw groove). Therefore, when the spark plug is attached to the internal combustion engine and when the spark plug is removed from the internal combustion engine, biting of the screw thread at the edge of the opening can be restrained more reliably.

In the above-described spark plug according to the one aspect of the present disclosure, the sloping portion may be provided on opposite sides of the opening in a cross section of the opening at the position where the crest of the screw thread intersects with the edge of the opening.

By virtue of the above-described configuration, in both the case where the spark plug rotates clockwise about the axial line and the case where the spark plug rotates counterclockwise about the axial line, the sloping portion of the opening is present in the advance direction of the screw. Accordingly, biting of the screw thread can be prevented at both the time of attachment of the spark plug to the internal combustion engine and the time of removal of the spark plug from the internal combustion engine.

In the above-described spark plug according to the one aspect of the present disclosure, the sloping portion may be provided in a region extending over two or more thread portions of the screw thread.

The diameter of the opening is set to match the size of the ground electrode, and is normally larger than the screw pitch (the distance between two thread portions located adjacent to each other in the axial direction) of the screw thread provided on the outer circumferential surface of the tubular portion. Therefore, the opening is formed over a region where two or more thread portions of the screw thread located adjacent to each other in the axial direction are formed. In view of this, it is preferred that the sloping portion of the opening be also formed over the region where two or more thread portions of the screw thread located adjacent to each other in the axial direction are formed. As a result, it is possible to prevent biting of each screw thread present at the edge of the opening.

As described above, the spark plug according to the one aspect of the present disclosure can restrain biting of the screw thread formed on the outer circumferential surface of the metallic shell member, for example, when the spark plug is attached to an internal combustion engine.

DETAILED DESCRIPTION OF THE INVENTION

Figure 1:
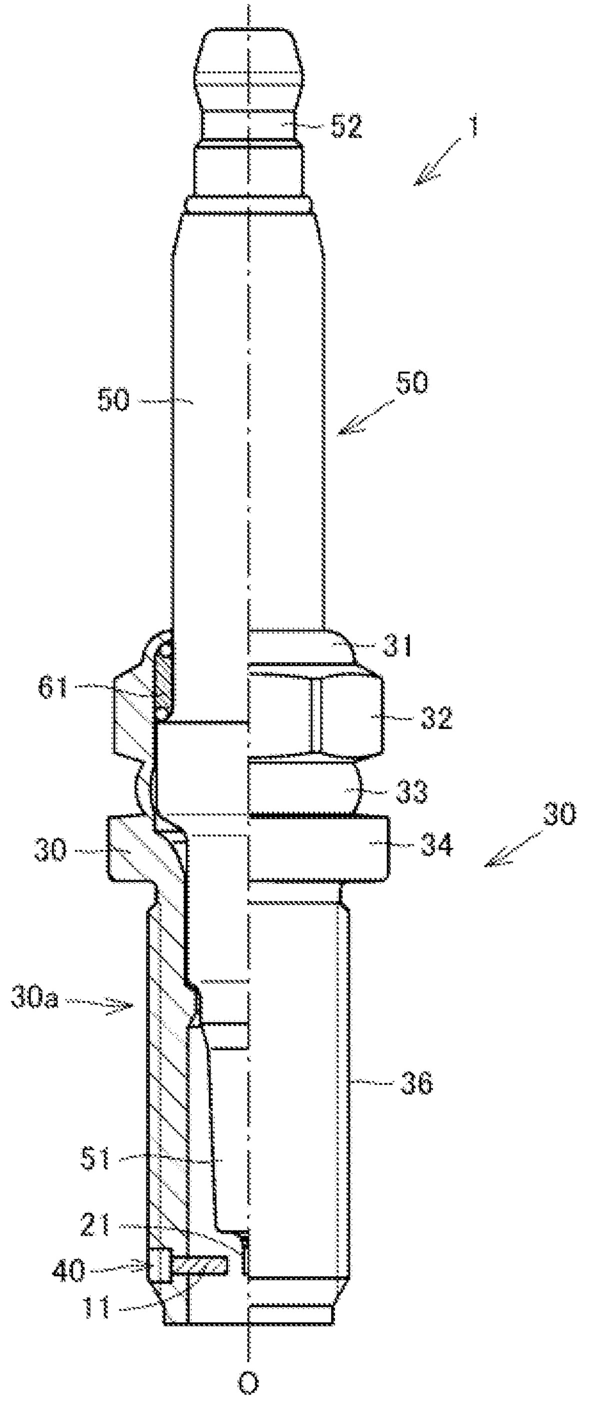
FIG. 1 shows a partial sectional view showing the appearance and internal structure of a spark plug according to one embodiment.

Embodiments of the present invention will now be described with reference to the drawings. FIG. 1 schematically shows the structure of a spark plug 1 according to one embodiment of the present invention.

First Embodiment in the first embodiment, a spark plug of a lateral discharge type will be described as an example.

(Overall Structure of Spark Plug)

First, the overall structure of the spark plug 1 will be described with reference to FIG. 1. The spark plug 1 includes an insulator 50 and the metallic shell (metallic shell member) 30.

The insulator 50 is an approximately cylindrical tubular member extending in a longitudinal direction of the spark plug 1. An axial hole extending along an axial line O is formed in the insulator 50. The insulator 50 is formed of a material which is excellent in insulating property, heat resistance, and heat conductivity. For example, the insulator 50 is formed of an alumina-based ceramic material or the like. A center electrode 21 is provided in a forward end portion 51 of the insulator 50. A side in the spark plug 1 where the center electrode 21 is provided will be referred to as the forward end side of the spark plug 1, and a side opposite the forward end side will be referred to as the rear end side. A metallic terminal member 52 is attached to a rear end portion of the insulator 50.

The center electrode 21 is inserted into and held in the axial hole of the insulator 50 in such a manner that a forward end portion of the center electrode 21 protrudes from the forward end portion 51 of the insulator 50. The center electrode 21 is attached to the insulator 50 in such a manner that the center electrode 21 is located on the axial line O of the approximately cylindrical tubular insulator 50. The center electrode 21 has an approximately circular columnar shape, and its diameter decreases slightly toward its forward end. A noble metal tip (not shown) formed into, for example, a cylindrical columnar shape is joined to the forward end of the center electrode 21 by means of, for example, welding.

The center electrode 21 is formed of, for example, a metallic material such as an Ni-based alloy containing Ni (nickel) as a main component. An example of an alloy element added to the Ni-based alloy is Al (aluminum). A core (not shown) may be embedded in the center electrode 21. The core may be formed of a metallic material (for example, Cu (copper) or Cu alloy or the like) which is more excellent in thermal conductivity the electrode base member which forms the center electrode 21. Notably, in a different embodiment, the core may be omitted; i.e., not provided in the center electrode 21. Namely, the center electrode may be formed of the electrode base member only.

The metallic shell 30 is an approximately cylindrical tubular member which is fixed to a threaded hole of an internal combustion engine. The metallic shell 30 is provided to partially cover the outer circumference of the insulator 50. In a state in which a portion of the insulator 50 has been inserted into the metallic shell 30 having an approximately cylindrical tubular shape, a gap is present between the metallic shell 30 and the insulator 50 on the rear end side of the metallic shell 30. The gap is filled with talc 61.

The metallic shell 30 is formed of an electrically conductive metallic material. Examples of such a metallic material include low carbon steel and a metallic material which contains iron as a main component. The metallic shell 30 has mainly a crimp portion 31, a tool engagement portion 32, a curved portion 33, a bearing portion 34, a trunk portion 36, etc. These portions are disposed along the axial line O and form a tubular portion 30*a* of the metallic shell 30 as a whole.

The crimp portion 31 and the curved portion 33 are portions for attaching the metallic shell 30 to the insulator 50. The tool engagement portion 32 is a portion with which a tool such as a wrench is engaged when the metallic shell 30 is attached to the threaded hole of the internal combustion engine. The bearing portion 34 is located between the tool engagement portion 32 and the trunk portion 36. In a state in which the spark plug 1 is attached to the internal combustion engine, an annular gasket is disposed on the bearing portion 34. The trunk portion 36 is located on the side where the forward end portion 51 of the insulator 50 is present. When the spark plug 1 is attached to the internal combustion engine, a screw shape 37 (namely, a screw thread 37*a* and a screw groove 37*b*) (see FIG. 2, etc.) formed on the outer circumference of the trunk portion 36 is screwed into the threaded hole of the internal combustion engine.

Also, aground electrode 11 is provided on the forward end portion side of the metallic shell 30 (on the side where the trunk portion 36 is located). The ground electrode 11 is a rod-like member which penetrates the trunk portion 36 having an approximately cylindrical tubular shape and extends toward the center electrode 21 in a direction approximately orthogonal to the axial line O. The ground electrode 11 is inserted into a space inside the tubular portion 30*a* from an opening 40 provided in the trunk portion 36.

The ground electrode 11 is formed, for example, by using, as an electrode base material, a metallic material such as an Ni-based alloy containing Ni (nickel) as a main component. An example of an alloy element added to the Ni-based alloy is Al (aluminum). The ground electrode 11 may contain, as a component other than Ni, at least one element selected from Mn (manganese), Cr (chromium), Al (aluminum), and Ti (titanium). Also, instead of the Ni-based alloy, a metallic material which contains, as a main component, a noble metal such as Pt (platinum), Ir (iridium), or the like may be used.

Figure 2:
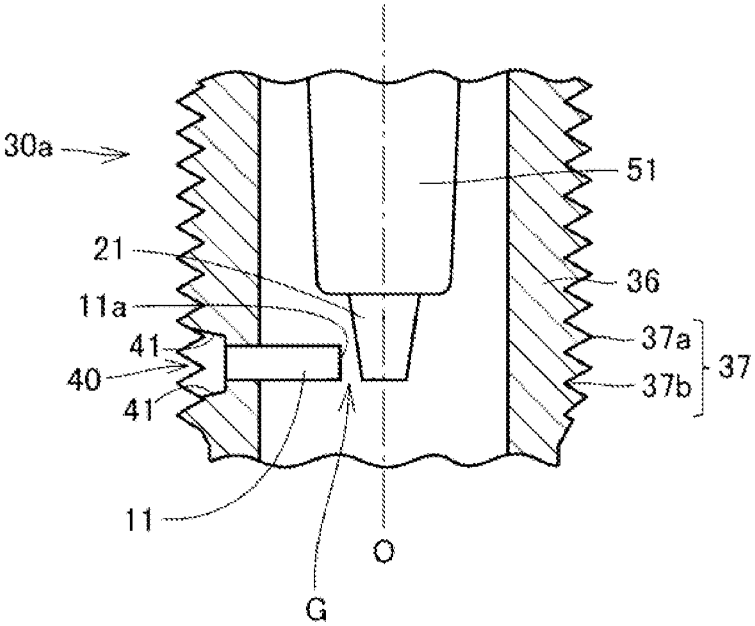
FIG. 2 shows a schematic side view showing, on an enlarged scale, a region in the spark plug according to the first embodiment where a center electrode and a ground electrode are attached.

FIG. 2 shows a state in which the ground electrode 11 has been attached to the opening 40 of the metallic shell 30. As shown in FIG. 2, the spark plug 1 according to the present embodiment is a spark plug of a so-called lateral discharge type in which the ground electrode 11 is disposed such that its forward end surface 11*a* faces the side surface of the center electrode 21.

In the spark plug 1 according to the present embodiment, a discharge gap G is formed between a side surface portion of the center electrode 21 extending along the axial line O and the forward end surface 11*a* of the ground electrode 11 extending toward the center electrode 21 in a direction approximately orthogonal to the axial line O (see FIG. 2).

Notably, in the present embodiment, the ground electrode 11 has a structure in which the base member of the ground electrode 11 has the forward end surface 11*a* facing the side surface of the center electrode 21. However, in a different embodiment, the ground electrode 11 may have a structure in which a noble metal tip is provided on the forward end surface of the base member of the ground electrode 11.

(Configuration of Opening of Metallic Shell)

Figure 3:
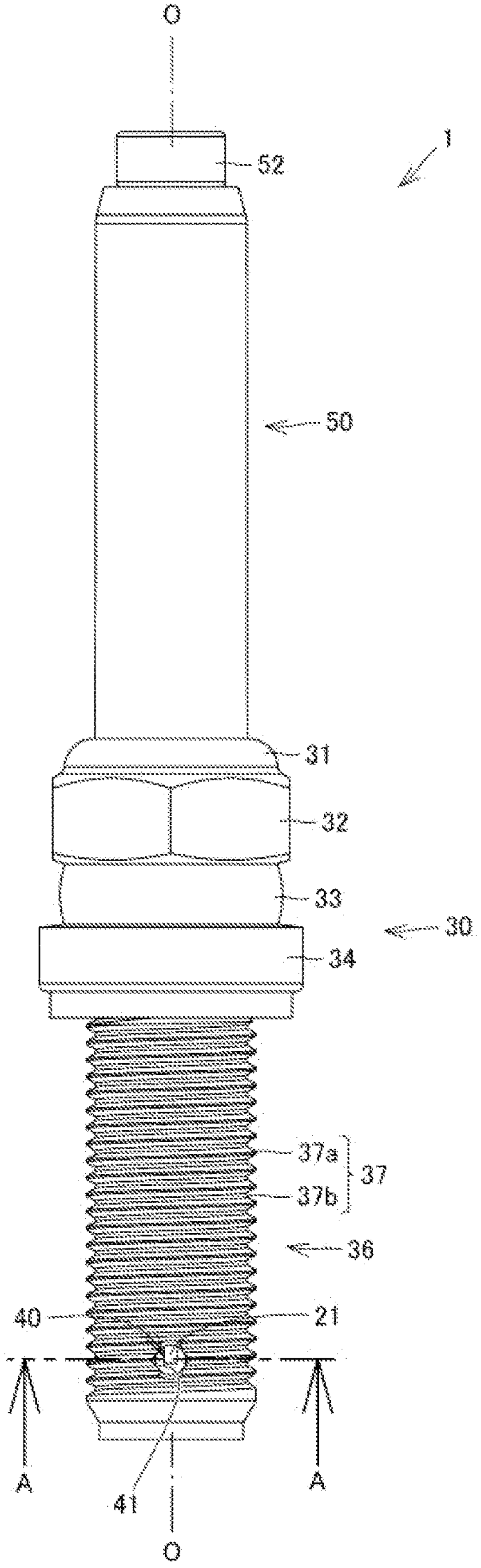
FIG. 3 shows a side view showing the appearance of the spark plug according to the first embodiment.
Figure 4:
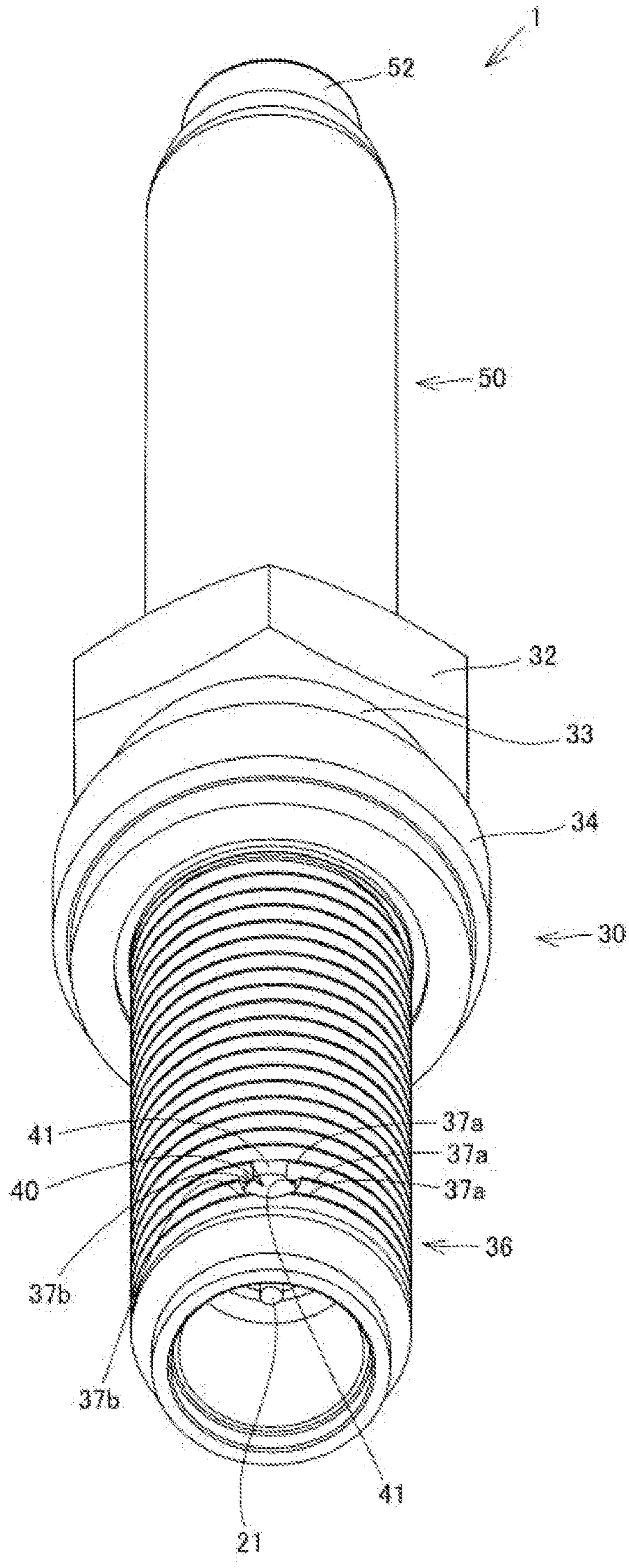
FIG. 4 shows a perspective view showing the appearance of the spark plug according to the first embodiment.

Subsequently, the configuration of the opening 40 provided in the tubular portion 30*a* (specifically, the trunk portion 36) of the metallic shell 30 will be described in detail. FIGS. 3 and 4 show the appearance of the spark plug 1 according to the first embodiment. In FIGS. 3 and 4, the spark plug 1 in a state in which the ground electrode 11 has not yet been attached is shown. FIG. 3 is a side view of the spark plug 1 showing the side where the opening 40 is provided. FIG. 4 is a perspective view of the spark plug 1 showing the shape of the opening 40.

Figure 5:
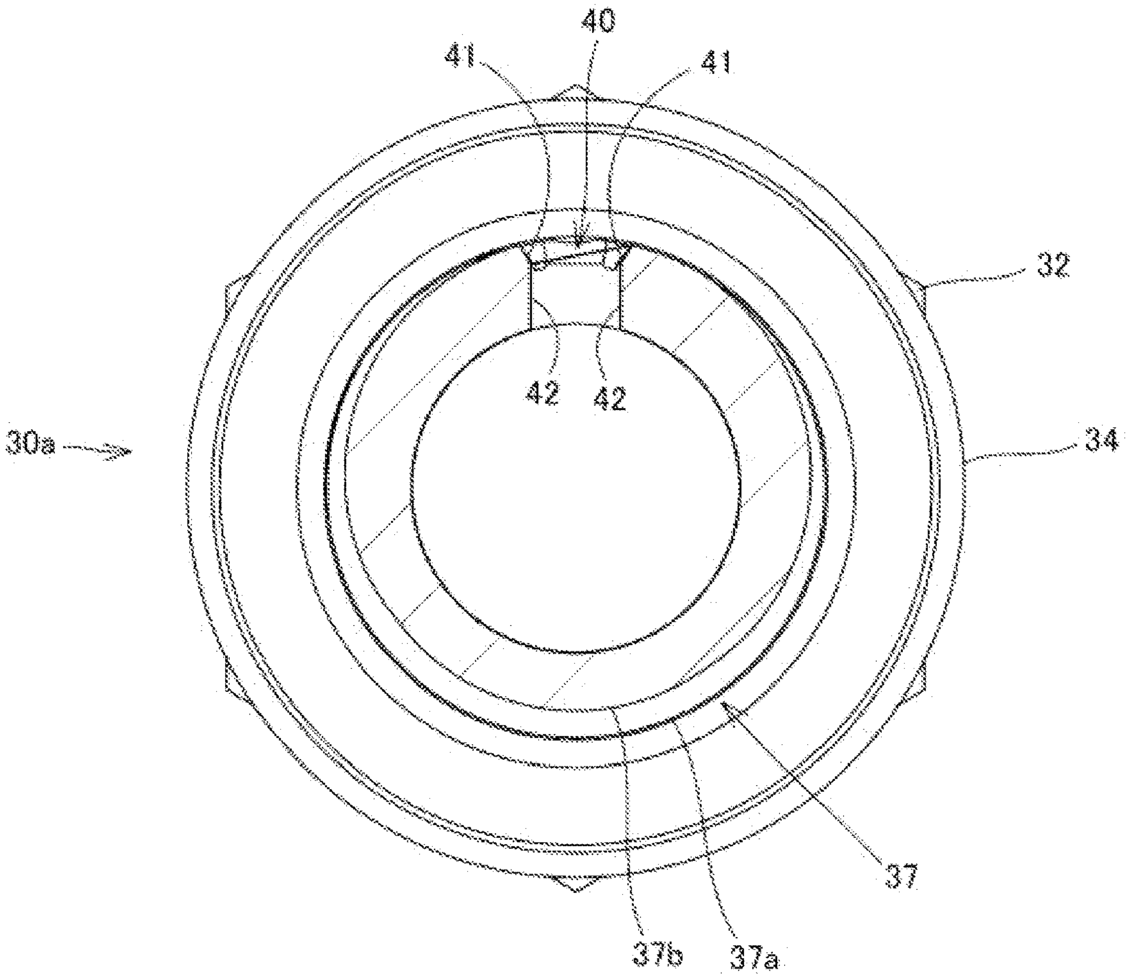
FIG. 5 shows a sectional view showing the structure of a portion of a metallic shell shown in FIG. 3 along line A-A.

FIG. 5 shows the configuration of a cross section of the metallic shell 30. FIG. 5 is a sectional view of a portion along line A-A shown in FIG. 3. This line A-A is a line which is orthogonal to the axial line O and passes through a position where one crest of the screw thread 37*a* intersects with the edge of the opening 40.

As shown in FIG. 3, the opening 40 is provided in a forward end portion of the trunk portion 36 of the metallic shell 30. More specifically, the opening 40 is formed at a position which is approximately the same as the position, in the direction of the axial line O, of the forward end portion of the center electrode 21 provided in the forward end portion of the insulator 50. As a result, when the ground electrode 11 is attached to the opening 40, the forward end surface 11*a* of the ground electrode 11 is disposed to face the side surface of the center electrode 21 near the forward end portion thereof.

The opening 40 has a size which allows insertion of the rod-shaped electrode base member, which forms the ground electrode 11. In general, the diameter of the opening 40 is set to be larger than the screw pitch (the distance between two thread portion of the screw threads 37*a* located adjacent to each other in the axial direction) of the screw shape 37 provided on the surface of the trunk portion 36. Therefore, the opening 40 is formed over a region where two or more thread portions of the screw thread 37*a* located adjacent to each other in the axial direction are formed.

A taper portion 41 is provided on the outer circumferential surface side of the opening 40. The taper portion 41 slopes such that it tapers (namely, decreases the opening diameter of the opening 40) from the outer circumferential surface of the tubular portion 30*a* toward the inner circumferential surface side. Such a taper portion 41 is formed at least on the outer circumferential surface side of the tubular portion 30*a* from which the electrode base member of the ground electrode 11 is fitted into. Since the opening 40 on the outer circumferential surface side of the tubular portion 30*a* has such a shape, it is possible to decrease the possibility that, for example, when the spark plug 1 is screwed into a threaded hole of an internal combustion engine, the screw thread 37*a* bites into the threaded hole of the internal combustion engine.

FIG. 5 is a sectional view obtained by cutting the trunk portion 36 of the metallic shell 30 orthogonally to the axial line O, at the position where one crest of the screw thread 37*a* intersects with the edge of the opening 40. In such across section of the metallic shell 30, the opening 40 has the taper portion 41 which tapers from the outer circumferential surface of the tubular portion 30*a* toward the inner circumferential surface thereof.

The taper portion 41 is provided at least in the region where the screw shape 37 is formed. In the present embodiment, the taper portion 41 is provided to extend to a position which is slightly offset toward the inner circumferential surface side from the region where the screw shape 37 is formed. Namely, the taper portion 41 is provided to reach a position whose depth is slightly greater than the depth of the groove of the screw shape 37. As shown in FIG. 5, a back-side machined surface 42 of the opening 40 on the inner circumferential surface side with respect to the region where the screw shape 37 is formed does not have a taper shape, so that the opening 40 has a constant opening diameter. The opening diameter of the opening 40 in a region where the back-side machined surface 42 is formed is set to match the size of the electrode base member of the ground electrode 11 to be inserted.

Figure 10:
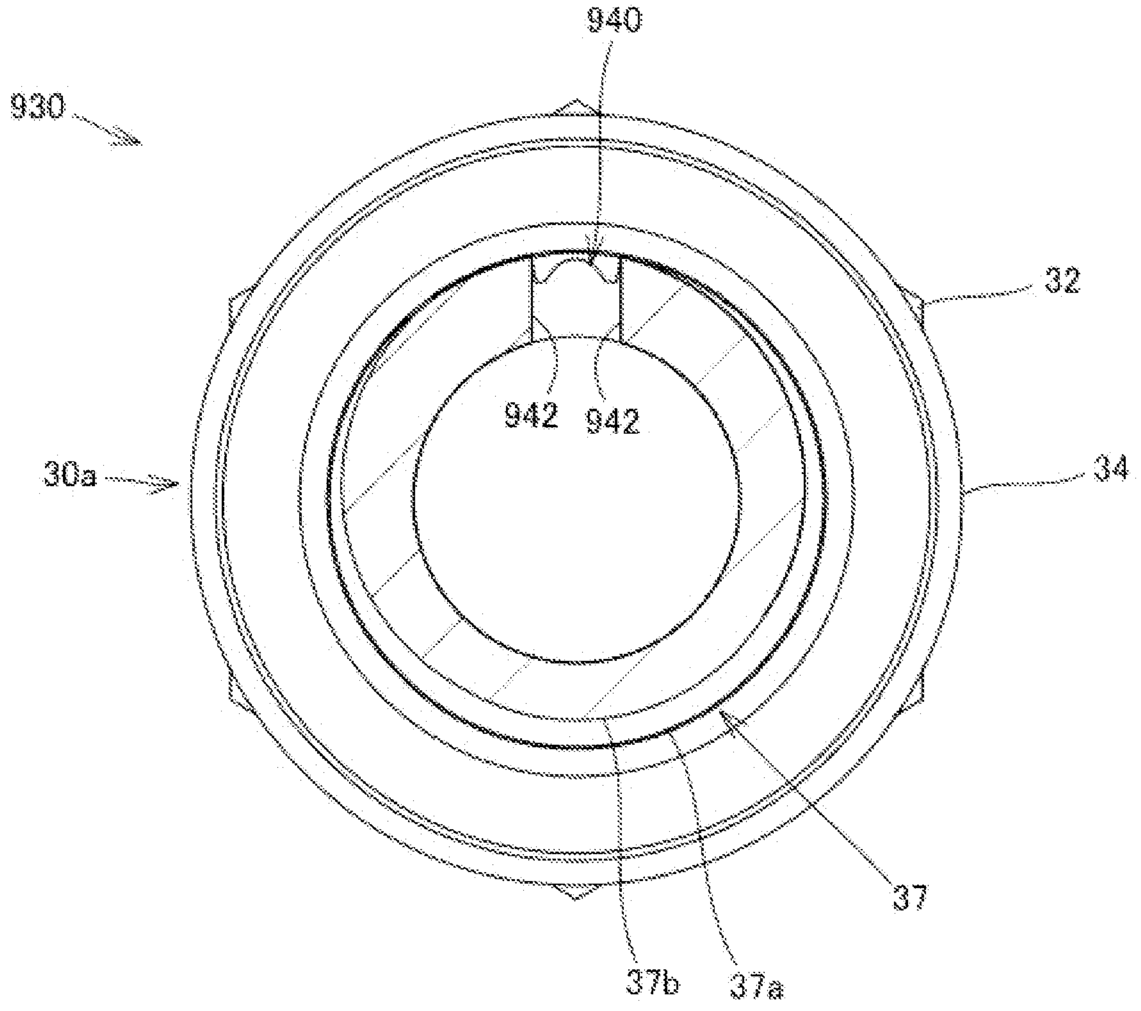
FIG. 10 shows a sectional view showing the structure of a metallic shell provided in a conventional spark plug.

Here, for comparison, the configuration of an opening provided in a metallic shell of a conventional spark plug will be described. FIG. 10 shows the configuration of a cross section of a metallic shell 930 of a conventional spark plug. This view is a sectional view obtained by cutting the metallic shell 930 of the conventional spark plug at a position corresponding to the line A-A shown in FIG. 3. An opening 940 into which the ground electrode 11 is inserted is provided in the tubular portion 30*a* (specifically, the trunk portion 36) of the metallic shell 930. Notably, the basic structure of the metallic shell 930, excluding the opening 940, is the same as the metallic shell 30.

As shown in FIG. 10, in the conventional spark plug, the opening diameter of the opening 940 is approximately constant from the outer circumferential surface of the tubular portion 30*a* to the inner circumferential surface thereof. Namely, the opening 940 formed in the metallic shell 930 of the conventional spark plug does not have the taper portion 41, and the machined surface 942 of the opening 940 is orthogonal to the inner diameter center axis of the metallic shell 930. If the opening 940 has such a shape, when the spark plug is screwed into a threaded hole of an internal combustion engine, a screw thread portion which borders on the opening 940 has a shape which inclines forward with respect to the rotating direction of the screw (namely, the advance direction of the spark plug) (see FIG. 7). Therefore, when the spark plug is attached to the internal combustion engine or removed therefrom, the screw thread may bite into the threaded hole of the internal combustion engine.

In contrast, in the spark plug 1 according to the present embodiment, the opening 40 provided in the metallic shell 30 has the taper portion 41. As a result, it is possible to decrease the possibility that, for example, when the spark plug 1 is screwed into a threaded hole of an internal combustion engine, the screw thread 37*a* bites into the threaded hole of the internal combustion engine.

Such a taper portion 41 is preferably formed at least over the region where the screw shape 37 is formed (namely, from the screw thread 37*a* to the screw groove 37*b*) in the depth direction of the opening 40. As a result, the taper shape is formed over the entirety of the region which is located on the outer circumferential surface side of the trunk portion 36 and where the screw shape 37 is formed. Therefore, it is possible to more reliably restrain biting of the screw thread at the edge of the opening when the spark plug 1 is attached to the internal combustion engine or removed therefrom.

Also, as shown in FIG. 5, the taper portion 41 is preferably provided on both sides of the opening 40 in the cross section of the opening 40 at the position where the crest of the screw thread 37*a* intersects with the edge of the opening 40. As a result, it is possible to prevent biting of the screw at both the time of attachment of the spark plug 1 to the internal combustion engine and the time of removal of the spark plug 1 from the internal combustion engine (namely, in both advance directions R1 and R2 of the screw shown in FIG. 6).

Notably, in the present embodiment, the taper portion 41 as described above is provided over approximately the entire region of the edge of the opening 40. By virtue of this, when the opening 40 is formed by counter boring performed by using a cutting tool, machining of the cut surface having the taper portion 41 becomes easy.

Figure 6:
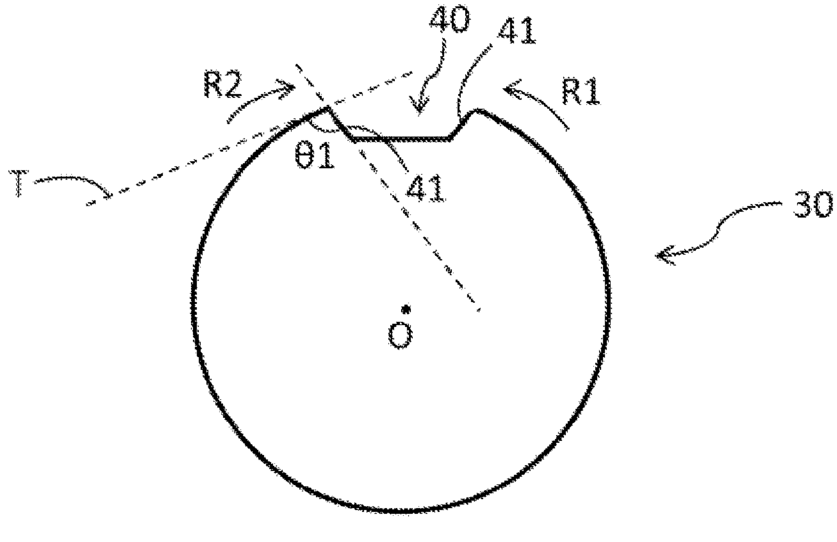
FIG. 6 shows a schematic view showing the shape of a cross section of an opening formed in the metallic shell of the spark plug according to the first embodiment.
Figure 7:
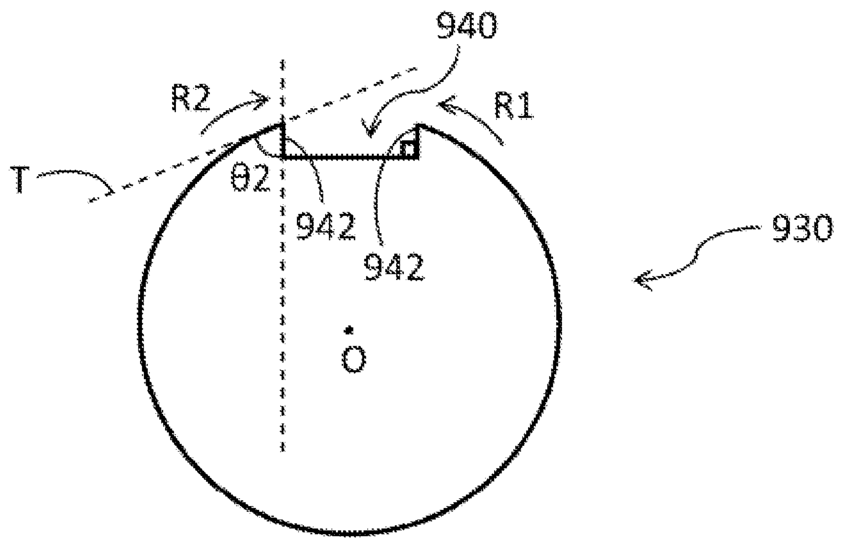
FIG. 7 shows a schematic view showing the shape of a cross section of an opening formed in the metallic shell of a conventional spark plug.
Figure 8:
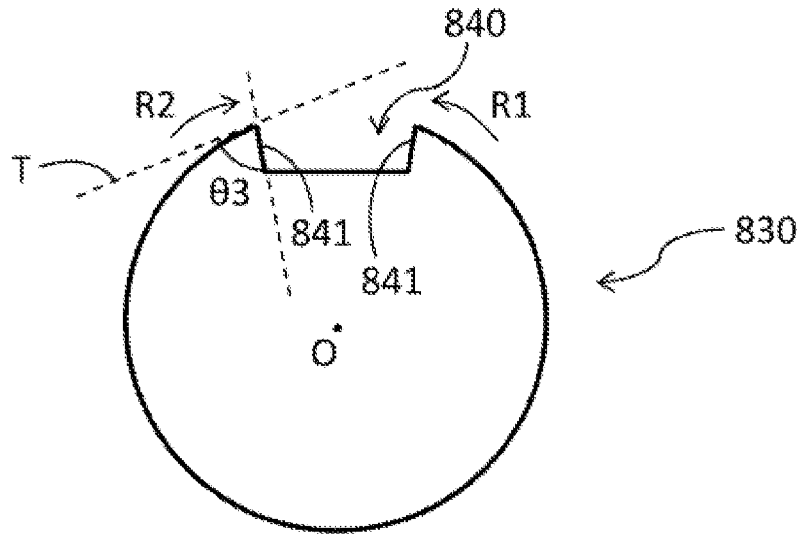
FIG. 8 shows a schematic view showing the shape of a cross section of an opening formed in the metallic shell of a spark plug which is compared with the spark plug according to the first embodiment.

The sloping angle of the taper portion 41 will be described with reference to FIGS. 6 to 8. FIGS. 6 to 8 schematically show cross sections of the metallic shells 30 in which the openings have different cross sectional shapes. In FIGS. 6 to 8, the advance direction of the screw when the spark plug 1 is attached to an internal combustion engine is represented by R1, and the advance direction of the screw when the spark plug 1 is removed from an internal combustion engine is represented by R2.

FIG. 6 is a schematic view showing the shape of a cross section of the opening 40 of the spark plug 1 according to the present embodiment (for example, a cross section of a portion along line A-A of FIG. 3). In FIG. 6, only the shape of the opening 40 on the outer circumferential surface side is shown. Namely, in FIG. 6, the back-side machined surface 42 provided on the inner circumferential surface side of the taper portion 41 is not shown.

In the spark plug 1 shown in FIG. 6, the angle θ1 formed between the taper portion 41 of the opening 40 and a tangent line T to the outer circumferential surface at the boundary between the opening 40 and the crest of the screw thread 37*a* provided on the outer circumferential surface of the tubular portion 30*a* of the metallic shell 30 is 90 degrees or greater.

FIG. 7 is a schematic view showing the shape of a cross section of the opening 940 of the metallic shell 930 of the conventional spark plug (for example, a cross section at a position corresponding to the portion along line A-A of FIG. 3). As having been described with reference to FIG. 10, the machined surface 942 of the opening 940 of the metallic shell 930 is orthogonal to the inner diameter center axis of the metallic shell 930.

In the conventional spark plug shown in FIG. 7, the angle θ2 formed between the machined surface 942 of the opening 940 and a tangent line T to the outer circumferential surface at the boundary between the opening 940 and the crest of the screw thread 37*a* provided on the outer circumferential surface of the tubular portion 30*a* of the metallic shell 930 is an acute angle (less than 90 degrees).

In such a configuration, the screw thread portion which borders on the opening 940 has a shape which inclines forward with respect to the rotating direction of the screw (namely, the advance direction R1 or R2 of the spark plug). Therefore, when the spark plug is attached to the internal combustion engine or removed therefrom, the screw thread may bite into the threaded hole of the internal combustion engine.

FIG. 8 is a schematic view showing the shape of a cross section of the opening 840 of the metallic shell 830 of a spark plug to be compared with the spark plug 1 (for example, a cross section at a position corresponding to the portion along line A-A of FIG. 3). The opening 840 shown in FIG. 8 has a taper portion 841 which tapers from the outer circumferential surface of the tubular portion 30*a* toward the inner circumferential surface side. This taper portion 841 differs from the taper portion 41 in terms of the sloping angle with respect to the tangent line T In the spark plug shown in FIG. 8, the angle θ3 formed between the taper portion 841 of the opening 840 and the tangent line T to the outer circumferential surface at the boundary between the opening 840 and the crest of the screw thread 37*a* provided on the outer circumferential surface of the tubular portion 30*a* of the metallic shell 830 is an acute angle (less than 90 degrees). Namely, θ3<90 degrees≤θ1.

In such a configuration, the screw thread portion which borders on the opening 840 slightly inclines forward with respect to the rotating direction of the screw (namely, the advance direction R1 or R2 of the spark plug). Therefore, when the spark plug is attached to the internal combustion engine or removed therefrom, the screw thread may bite into the threaded hole of the internal combustion engine, although the possibility of biting of the screw thread at the time of screw rotation is reduced as compared with the conventional spark plug as shown in FIG. 7.

As described above, in the spark plug 1 according to the present embodiment, the angle θ1 formed between the taper portion 41 of the opening 40 and the tangent line T to the outer circumferential surface of the metallic shell 30 is 90 degrees or greater. As a result, for example, when the spark plug 1 is screwed into a threaded hole of an internal combustion engine, the screw thread 37*a* has a shape which does not incline forward with respect to the advance direction of the screw. Therefore, it is possible to decrease the possibility that the screw thread 37*a* bites into the threaded hole of the internal combustion engine when the spark plug 1 is attached to the internal combustion engine or is removed from the internal combustion engine.

Also, since the opening 40 has the taper portion 41 as described above, it is possible to reduce the possibility of interference between the screw thread 37*a* and the electrode base member inserted into the opening 40 when the ground electrode 11 is attached to the opening 40 of the metallic shell 30. Therefore, a process of inserting and fixing the ground electrode at the time of manufacture of the spark plug 1 can be performed more easily.

Notably, a conventionally known cutting, counterboring, or the like can be used for formation of the opening 40 in the metallic shell 30. A rod-shaped electrode base member which serves as the ground electrode 11 is inserted into the formed opening 40 and is fixed. Fixing of the ground electrode 11 to the metallic shell 30 is performed by means of, for example, press-fitting or welding. As a result, there can be obtained the ground electrode 11, which extends from the tubular portion 30*a* of the metallic shell 30 in a direction intersecting with the axial line O. In the method of manufacturing the spark plug 1, the same manufacturing method as a conventional spark plug manufacturing method can be applied to the manufacturing steps, except for the step of forming the opening 40.

In the present embodiment, the cross sectional shape of the opening 40 obtained by cutting the trunk portion 36 of the metallic shell 30 orthogonally to the axial line O such that the cross section intersects with one of the screw threads 37*a* has been described as an example. Notably, in the spark plug 1 according to the present embodiment, a similar taper portion 41 (sloping portion) may be provided in the cut surface of the opening 40 even when the trunk portion 36 of the metallic shell 30 is cut along the screw thread 37*a* such that the cut surface intersects with the axial line O.

Summary of First Embodiment

As described above, the spark plug 1 includes the metallic shell (metallic shell member) 30 having the tubular portion 30*a*, the center electrode 21 disposed inside the tubular portion 30*a*, and the ground electrode 11 which is inserted into the opening 40 provided in the tubular portion 30*a* and forms a gap between the center electrode 21 and a forward end portion of the ground electrode 11 in a direction in which the ground electrode 11 extends. The outer circumferential surface of the tubular portion 30*a* has the screw shape 37 (the screw thread 37*a* and the screw groove 37*b*). The opening 40 has the taper portion (sloping portion) 41 which tapers from the outer circumferential surface of the tubular portion 30*a* toward the inner circumferential surface side as viewed in a cross section of the tubular portion 30*a* which is taken orthogonal to the axial line O at the position where the crest of the screw thread 37*a* intersects with the edge of the opening 40.

The sloping angle θ1 of the taper portion 41 is 90 degrees or greater in relation to the tangent line T to the outer circumferential surface of the tubular portion 30*a* at the position of the boundary between the crest (namely, the screw thread 37*a*) of the screw thread (namely, the screw shape 37) and the opening 40 (see FIG. 6). As a result, for example, when the spark plug 1 is screwed into a threaded hole of an internal combustion engine, the screw thread 37*a* does not incline forward with respect to the advance direction of the screw. Therefore, it is possible to decrease the possibility that the screw thread 37*a* bites into the threaded hole of the internal combustion engine when the spark plug 1 is attached to the internal combustion engine or is removed from the internal combustion engine.

Notably, it is preferred that the angle formed between the tangent line T and the sloping portion 41 (namely, the sloping angle θ1 of the taper portion 41) be greater than 90 degrees (namely, an obtuse angle). By virtue of this configuration, the screw thread portion bordering on the opening 40 has a shape which inclines backward more with respect to the screw rotating direction. Therefore, it is possible to further decrease the possibility of biting at the time of screw rotation. Also, the angle formed between the tangent line T and the sloping portion 41 (namely, the sloping angle θ1 of the taper portion 41) is set more preferably to 110 degrees or greater, further preferably 120 degrees or greater.

Second Embodiment

Subsequently, a spark plug 1 according to a second embodiment will be described. In the first embodiment described above, a lateral-discharge-type spark plug has been described as an example. The present invention can be applied to spark plugs other than lateral-discharge-type spark plugs. In view of this, in the second embodiment, a longitudinal-discharge-type spark plug will be described as an example.

Figure 9:
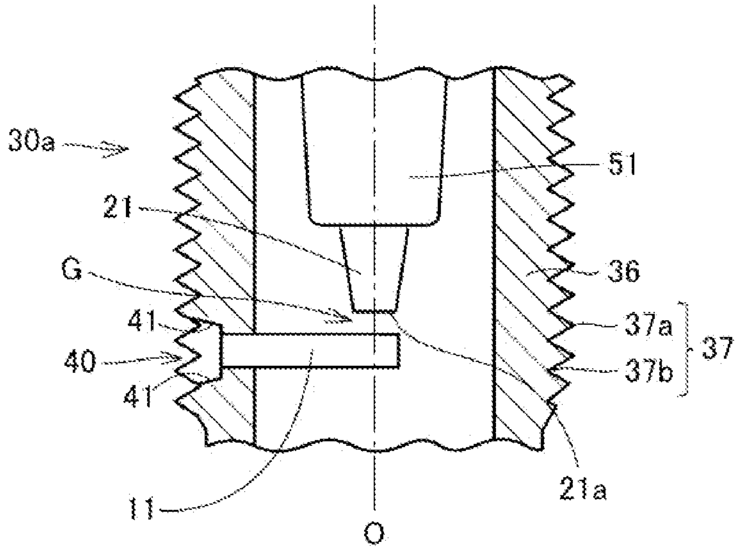
FIG. 9 shows a side view showing, on an enlarged scale, a region in a spark plug according to a second embodiment where a center electrode and a ground electrode are attached.

FIG. 9 shows the structure of a portion of the spark plug 1 according to the second embodiment. FIG. 9 is a side view showing, on an enlarged scale, a region of the spark plug 1 according to the present embodiment where the center electrode 21 and the ground electrode 11 are attached. As to the entire structure of the spark plug 1, the same structure as the first embodiment can be applied.

As shown in FIG. 9, in the spark plug 1 according to the present embodiment, a discharge gap G is formed between a forward end surface 21*a* of the center electrode 21 extending along the axial line O and a side surface of the ground electrode 11 extending toward the center electrode 21 in a direction approximately orthogonal to the axial line O, the side surface being located near the forward end portion of the ground electrode 11.

The ground electrode 11 is a rod-like member which penetrates the trunk portion 36 having an approximately cylindrical tubular shape and extends toward the center electrode 21 in a direction approximately orthogonal to the axial line O. The ground electrode 11 is inserted into a space inside the tubular portion 30*a* from the opening 40 provided in the trunk portion 36.

Like the first embodiment, the taper portion 41 is provided on the outer circumferential surface side of the opening 40. The taper portion 41 slopes such that it tapers (namely, decreases the opening diameter of the opening 40) from the outer circumferential surface of the tubular portion 30*a* toward the inner circumferential surface side. Such a taper portion 41 is formed at least on the outer circumferential surface side of the tubular portion 30*a* from which the electrode base member of the ground electrode 11 is fitted into (see FIG. 5). Like the first embodiment, the opening 40 may have a back-side machined surface 42 which is located on the inner circumferential surface side with respect to the region where the screw shape 37 is formed and which has a constant opening diameter over the entirety in the cutting direction.

Since the opening 40 on the outer circumferential surface side of the tubular portion 30*a* has such a shape, it is possible to decrease the possibility that, for example, when the spark plug 1 is screwed into a threaded hole of an internal combustion engine, the screw thread 37*a* bites into the threaded hole of the internal combustion engine.

Also, like the first embodiment, the angle θ1 formed between the taper portion 41 of the opening 40 and a tangent line T to the outer circumferential surface at the boundary between the opening 40 and the crest of the screw thread 37*a* provided on the outer circumferential surface of the tubular portion 30*a* of the metallic shell 30 is 90 degrees or greater. As a result, for example, when the spark plug 1 is screwed into a threaded hole of an internal combustion engine, the screw thread 37*a* does not incline forward with respect to the advance direction of the screw. Therefore, it is possible to decrease the possibility that the screw thread 37*a* bites into the threaded hole of the internal combustion engine when the spark plug 1 is attached to the internal combustion engine or is removed from the internal combustion engine.

The embodiments disclosed this time must be considered to be illustrative and not restrictive in all aspects. It is intended that the scope of the present invention is shown by the claims rather than the above description, and the present invention encompasses all modifications within the meanings and scopes equivalent to those of the claims. Also, the present invention encompasses configurations obtained by combining the configurations of different embodiments described in the present specification.

For example, in the embodiments disclosed this time, the metallic shell 30 is configured such that its forward end is open. However, in a different embodiment, the metallic shell 30 may be configured such that a cap member which forms a sub chamber and which covers the center electrode 21 and the ground electrode 11 from the forward end side is provided on the forward end side of the metallic shell 30.

Also, for example, in the embodiments disclosed this time, the taper portion 41 is configured such that straight slopes are formed in a cross section. However, in a different embodiment, the taper portion 41 may be configured such that curved slopes are formed in a cross section (namely, the sloping portion is curved).

REFERENCE SIGNS LIST

1: spark plug
11: ground electrode
21: center electrode
30: metallic shell (metallic shell member)
30*a*: tubular portion
37: screw shape (screw thread)
37*a*: screw thread (crest of the screw thread)
37*b*: screw groove
40: opening
41: taper portion (sloping portion)
50: insulator
G: discharge gap (gap)
O: axial line
T: tangent line (to the outer circumferential surface of the tubular portion)

What is claimed is:

1. A spark plug comprising:

a metallic shell member having a tubular portion extending along an axial line of the metallic shell;

a center electrode disposed inside the tubular portion and extending along the axial line; and a ground electrode which is inserted into an opening provided in the tubular portion and forms a gap between the center electrode and a forward end portion of the ground electrode in a direction in which the ground electrode extends, wherein a screw thread is provided on an outer circumferential surface of the tubular portion, the opening has a sloping portion which tapers from the outer circumferential surface of the tubular portion toward an inner circumferential surface side as viewed in a cross section of the tubular portion which is taken orthogonal to the axial line at a position where a crest of the screw thread intersects with an edge of the opening, and an angle formed between the sloping portion of the opening and a tangent line to the outer circumferential surface at a boundary between the opening and the crest of the screw thread is 90 degrees or greater.

2. The spark plug according to claim 1, wherein the sloping portion is provided at least over a region extending from the crest of the screw thread to a groove of the screw thread.

3. The spark plug according to claim 1, wherein the sloping portion is provided on opposite sides of the opening in a cross section of the opening at the position where the crest of the screw thread intersects with the edge of the opening.

4. The spark plug according to claim 1, wherein the sloping portion is provided in a region extending over two or more thread portions of the screw thread.

* * * * *